United States Patent [19]

Yamaguchi et al.

[11] Patent Number: 5,798,787
[45] Date of Patent: Aug. 25, 1998

[54] METHOD AND APPARATUS FOR DETECTING AN APPROACHING OBJECT WITHIN A MONITORING ZONE

[75] Inventors: Hideaki Yamaguchi; Akira Kasano, both of Tokyo, Japan

[73] Assignee: Kabushiki Kaisha Toshiba, Kawasaki, Japan

[21] Appl. No.: 689,348

[22] Filed: Aug. 8, 1996

[30] Foreign Application Priority Data

Aug. 11, 1995 [JP] Japan .................................. 7-205969

[51] Int. Cl.$^6$ ..................................................... H04N 7/18
[52] U.S. Cl. ........................... 348/152; 348/155; 348/153
[58] Field of Search ........................... 348/152, 153, 348/154, 118, 170, 148, 149, 119, 169–172, 161, 143, 116; H04N 7/18

[56] References Cited

U.S. PATENT DOCUMENTS

| | | | |
|---|---|---|---|
| 5,091,780 | 2/1992 | Pomerleau | 348/152 |
| 5,253,050 | 10/1993 | Karasudani | 358/103 |
| 5,283,644 | 2/1994 | Maeno | 348/152 |
| 5,304,980 | 4/1994 | Maekawa | 348/170 |
| 5,309,137 | 5/1994 | Kajiwara | 348/170 |
| 5,321,488 | 6/1994 | Irie | 348/139 |
| 5,481,619 | 1/1996 | Schwartz | 382/141 |

*Primary Examiner*—Tommy P. Chin
*Assistant Examiner*—Luanne P. Din
*Attorney, Agent, or Firm*—Oblon, Spivak, McClelland, Maier & Neustadt, P.C.

[57] ABSTRACT

A method and system for detecting the approaching of a target object into a monitoring zone wherein the target object is scheduled to enter the zone is provided. The method includes providing motion image data continuously taken as an image from the monitoring zone, initially setting a plurality of monitoring areas in an image plane of the monitoring zone on a track along which the target object moves, extracting the image data of these monitoring areas from the motion image data, detecting an image variation of the respective monitoring areas through the processing of the image data of the monitoring areas for each monitoring area and deciding, based on the detection sequence of the monitoring areas corresponding to a detected image variation, whether of not the target object approaches into the monitoring zone.

16 Claims, 11 Drawing Sheets

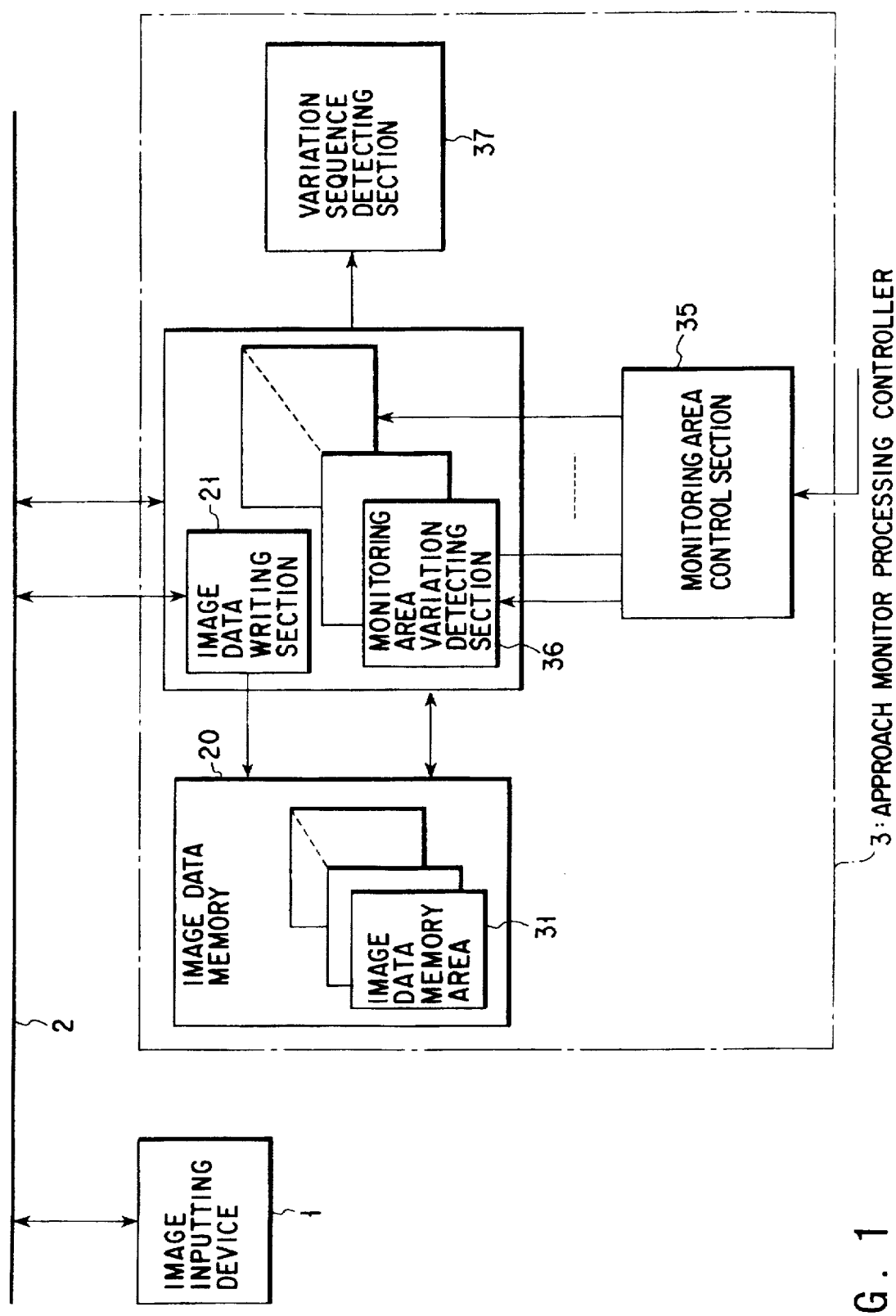
F I G. 1

| MONITORING AREA NO. | FLAG | SCHEDULED VARIATION SEQUENCE | REAL VARIATION SEQUENCE |
|---|---|---|---|
| 0 | 1 | 0 | 0 |
| 1 | 0 | 1 | 1 |
| 2 | 0 | 2 | 2 |
| 3 | 0 | 3 | |
| 4 | 0 | 4 | |
370
F I G. 4
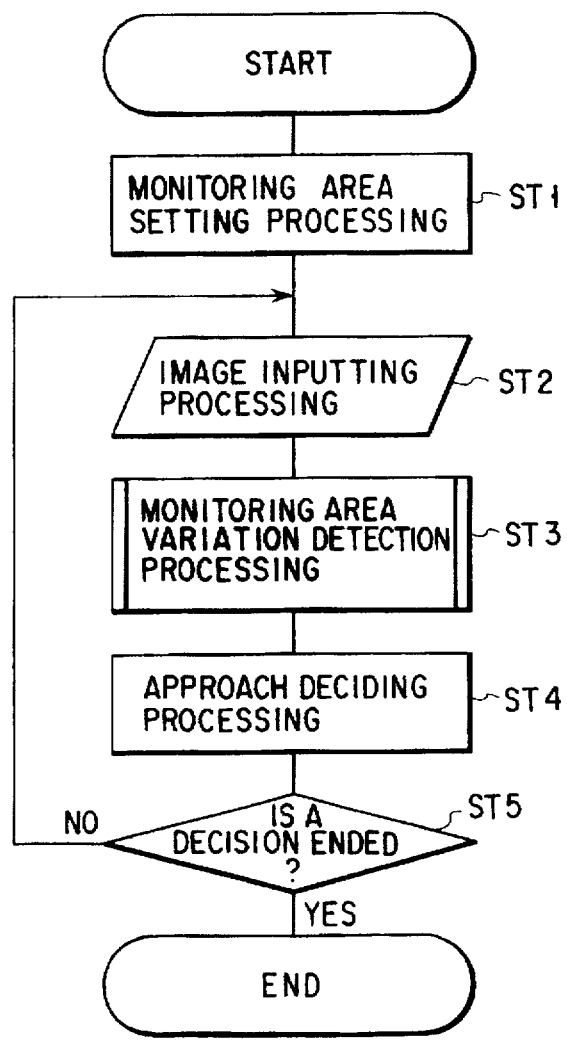
F I G. 5

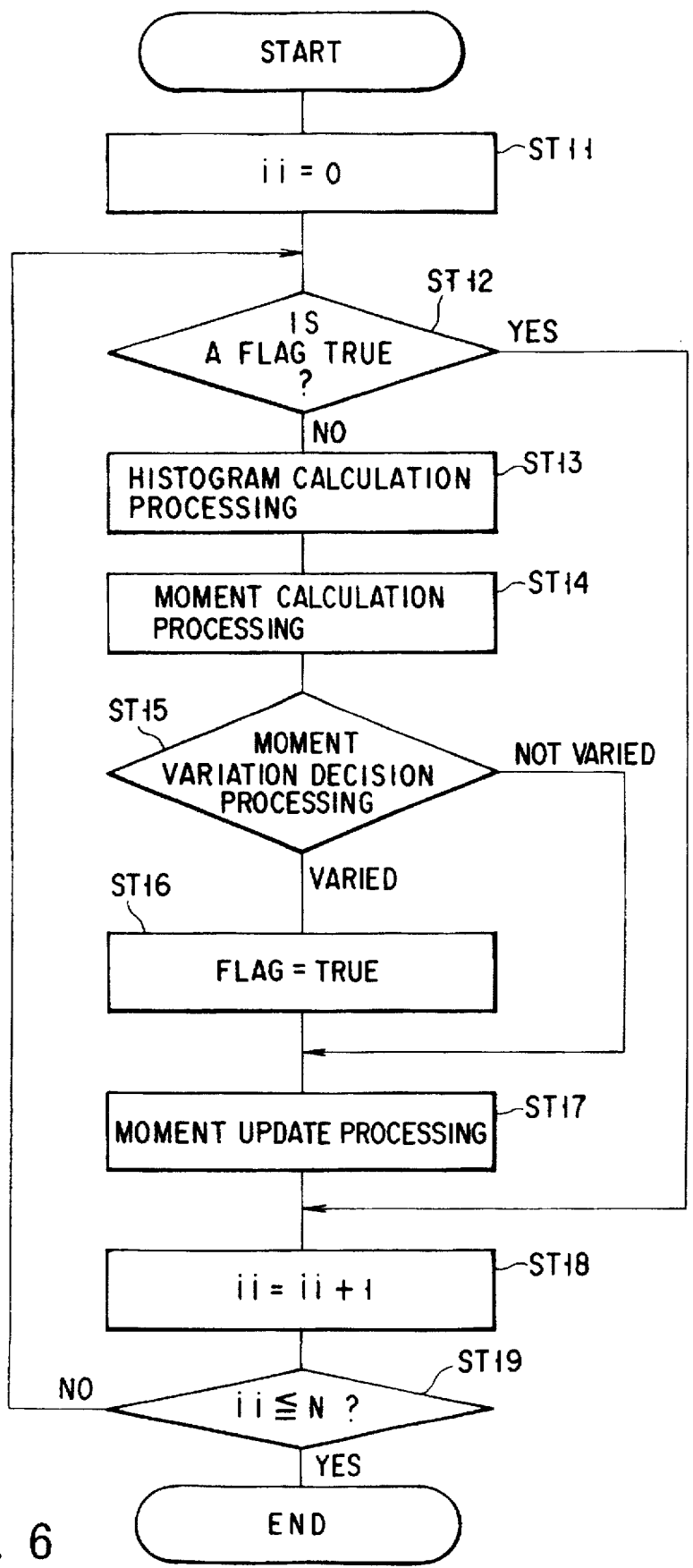
F I G. 6

| MONITORING AREA NUMBER ii | REAL VARIATION SEQUENCE (LAST) | GROUP NUMBER |
|---|---|---|
| 0 | 0 | 0 |
| 1 | — | |
| 2 | 1 | 1 |
| 3 | 2 | |
| 4 | — | 2 |
| 5 | 3 | |

| MONITORING AREA NO. | FLAG | TIME STAMP |
|---|---|---|
| 0 | 1 | ××× |
| 1 | 0 | ××× |
| 2 | 0 | ××× |
| 3 | 0 | ××× |
| 4 | 0 | ××× |

| MONITORING AREA | WEIGHT FACTOR |
|---|---|
| 33-1 | W11 |
| 33-2 | W21 |
| 33-3 | W22 |
| 33-4 | W23 |
| 33-5 | W12 |
| 33-6 | W13 |
| 33-7 | W14 |
| 33-8 | W24 |

METHOD AND APPARATUS FOR DETECTING AN APPROACHING OBJECT WITHIN A MONITORING ZONE

BACKGROUND OF THE INVENTION

1. Field of the Invention

The present invention relates to a method and apparatus for detecting the approach of objects into a monitoring zone and, in particular, a method and apparatus for detecting, from a continuous image obtained by continuously taking a monitoring zone, the entry into the monitoring zone of that object having its moving route known in the monitoring zone.

2. Description of the Related Art

The target object having its moving route already known in a monitoring zone includes an aircraft, a road route bus, a railway train, etc. In the airport, for example, landed aircraft on the runway moves from the runway into the predetermined facilities in the airport. The known approach detecting apparatus takes a picture of the monitoring zone including the approach route to the facilities concerned, detects a scheduled aircraft running along the approach route into the monitoring zone with the use of continuous motion image data and properly informs the approaching of the target aircraft into the monitoring zone to an operator or other apparatuses.

Such approach detecting apparatus has been used to detect not only the approach of the aircraft in the airport but also the approach of a target object or objects in various fields.

As the method for detecting the approach of the target object, which is adopted in the approach detecting apparatus, two typical procedures are known. One is to prepare an image (called a reference image) of the monitoring zone initially taken when there exists no target object in that monitoring zone, compare, with the reference image, a frame image constituting motion image data of an real monitoring zone, and detect an image variation between the frame image and the reference image and hence detect the approach of the target object from the image variation. The other is to extract feature amounts from the image data of the monitoring zone with the use of an image processing technique, such as the spatial filtering, and detect the approach of the target object from the extracted features.

In the approach detection apparatus, there is a demand for high detection accuracy involving neither a detection error nor a detection loss, an apparatus that is not affected by the conditions of the spatial illumination on the monitoring area, such as the illumination environment in the airport, and meteorolozical conditions, such as cloudy and fine weathers.

These two approach detection methods present the problems as indicated below.

Where a plurality of types of moving objects, such as the aircraft and bus, enter the same monitoring zone a moving object other than a target object or a detection loss of the target object.

Another object of the present invention is to provide a method for positively detecting a moving object other than a target object through the accurate identification of these objects even when the moving object approaches via a complex path.

According to the present invention, there is provided a method for detecting an approaching target object into a monitoring zone which is scheduled to enter into that zone, comprising the steps of:

taking a picture of an image for the monitoring zone continuously to provide a moving picture data initially setting a plurality of monitoring areas along a track of the target object in the image of the monitoring zone and extracting image data of these monitoring areas from the moving picture data;

processing the image data of the monitoring areas for each monitoring area and detecting an image variation of each monitoring area; and on the basis of a detection sequence of these monitoring areas where an image variation is detected, deciding whether or not the target object approaches into the monitoring zone.

According to the present invention, if an object approaching into the monitoring zone is a target object, an image variation appears in a predetermined at a same time, it is difficult, for the former detection method using the reference image, to individually separate these objects from each other and extract them.

Further, where the illumination conditions of the monitoring zone change steadily, it is necessary to initially prepare a plurality of reference images in accordance with the illumination conditions and perform the operation of properly switching these reference images in accordance with the time and image involved. Generally, this operation is very complex.

For the latter detection method, typically the spatial filtering method, using the image processing, it is difficult to acquire, with nearly constant values, featuring amounts accurately identifying the target objects because they are affected by the variation of the illumination conditions and of the illuminance.

These two detection methods are both liable to an adverse influence resulting from noise and illuminance variation. This involves a possibility of causing noise and illuminance variation.

SUMMARY OF THE INVENTION

An object of the present invention is to provide a method for positively detecting the approaching of any target objects, which, even under the illuminance of a monitoring zone, can prevent a detection error of sequence in an image corresponding to the monitoring objects. If, on the other hand, a moving object is other than the target object, an image variation may sometimes appear in the image corresponding to a portion of the monitoring areas, but does not appear in accordance with the sequence of the monitoring areas. Even under a varying illuminance it is possible to positively detect the target object without erroneously detecting that moving object as the target object.

A scheduled variation sequence is initially set as a sequence of the monitoring areas corresponding to an image variation involved upon the approaching of the target object into the monitoring zone and comparison is made between the detection sequence of those monitoring areas corresponding to the detected image variation and the scheduled variation sequence to decide whether or not the target object approaches into the monitoring zone.

Since an image variation detection sequence pattern of the respective monitoring areas is initially stored as a sequence following the track of the target object, it is possible to decide the target object as approaching into the monitoring zone if there is a coincidence between the detection sequence of the image variation in the monitoring areas and the image variation detecting sequence pattern and to decide the moving object other than the target object as approaching into the monitoring zone if there is no coincidence between the two. It is, therefore, possible to positively detect the approaching of the target object even if, in particular, the target object follows a complex track.

Further a decision is made as to whether or not there is any backward deviated detection sequence relative to the scheduled variation sequence in the detection sequence of a plurality of monitoring areas corresponding to the detected image variation and a decision is made as to whether or not there is at least one of monitoring areas corresponding to the detected image variation in each group into which the plurality of monitoring areas are divided in accordance with the scheduled variation sequence. The target object is decided as approaching into the monitoring zone when the detection sequence is not backward deviated and a decision is made to the effect that, in the respective group, there is at least one of the monitoring areas corresponding to the detected image variation.

Even when a detection loss of the image variation in some monitoring area upon the of the target object into the monitoring zone occurs, no problem arises therefrom if an image variation is detected in at least one monitoring area in each group.

The target object is decided as approaching into the monitoring zone by finding a detection time interval between the monitoring areas of a front/back deviated detection sequence in a plurality of monitoring areas corresponding to the detected image variation, comparing, with an initially set threshold value, the detection time interval relative to all detection area pairs of the front/back deviated detection sequence and finding all the detection time intervals in the threshold value range as a result of comparison.

Even when any other moving object moves on the same track as that of the target object, since their moving speeds are often different from each other, it is possible in such a case, through the execution of processing based on the detection time interval between the monitoring areas, to detect the target object in the monitoring zone in a way positively separate from the other moving object.

The target object is decided as approaching into the monitoring zone by finding a ratio (n/N) between the total sum of initially set monitoring areas, N, and the number of those monitoring areas, n, corresponding to the detected image variation, deciding whether or not there occurs any backward deviated sequence relative to the scheduled variation sequence in the detection sequence of a plurality of monitoring areas corresponding to the detected image variation and finding as a result that decision is made as the detection sequence being not backward deviated and that the ratio (n/N) exceeds the initially set threshold value.

Even if the image variation fails to be detected in some monitoring area, it is possible to decide the target object as approaching into the monitoring zone if the image variation sequence is correct and a condition α<n/N is satisfied.

With weight factors initially set to the respective monitoring areas in accordance with the degree of importance, the weight factors of the respective monitoring areas corresponding to the detected image variation are cumulatively added and, if the cumulative value of the weight values exceeds the initially set threshold value, the target object is decided as approaching into the monitoring zone.

Where a greater weight is set to the monitoring areas of importance on the track, if any image variation fails to be detected at those monitoring areas of importance, then it is possible to treat it as the object not approaching into the monitoring zone. Where, on the other hand, a smaller weight factor is set to those monitoring areas of lower importance, even if there occurs an image variation detection loss in the monitoring areas of low importance, it is possible to output a correct result decision.

A luminance histogram is prepared from the image data of the monitoring areas and a moment value of the monitoring areas is found from the histogram in accordance with the the following equation the moment value=$\Sigma(hist(ii) \times ii)$ where ii represents the luminance value and hist(ii) represents the frequency of the luminance value ii.

Where the variation of the moment value is detected at the monitoring areas, it is decided that there an image variation at the monitoring areas has occurred.

BRIEF DESCRIPTION OF THE DRAWINGS

FIG. 1 is a block diagram showing an apparatus, according to a first embodiment, for detecting the approaching of a target object;

FIG. 4 is a schematic view showing a management table;

FIG. 5 is a flow chart showing the operation of an approach monitoring processing controller;

FIG. 6 is a flow chart showing the operation of a monitoring area variation detecting section;

PREFERRED EMBODIMENTS OF THE PRESENT INVENTION

Figure 2:
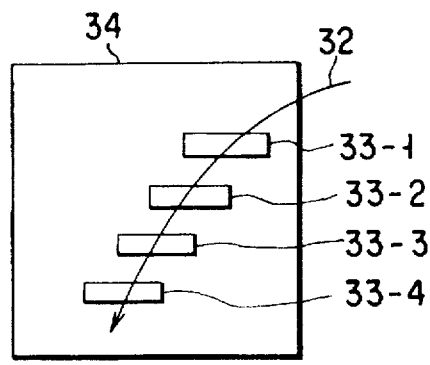
FIG. 2 is an explanatory view for explaining a relation between a track of the target object and monitoring areas set on the track.

The embodiments of the present invention will be explained below with reference to the accompanying drawings.

(First Embodiment)

FIG. 1 shows a basic functional block diagram of an approach detecting apparatus according to the first embodiment. An image inputting device 1 has a CCD video camera for taking a picture (image) of a monitoring zone in real time and an A/D converter for converting the image signal which is output from the CCD video camera to a digital signal. That is, the image inputting device 1 converts continuous moving picture data of the monitoring zone to digital image data represented by gradation data. The monitoring zone includes predetermined intervals on a moving route (path) of a target object to be detected. The digital image data output terminal of the image inputting device 1 is connected to a bus 2. The image inputting device 1 is connected via the bus to an approach monitoring processing controller 3. The digital image data which is output from the image inputting device 1 is transmitted to the approach monitoring processing controller 3.

The approach monitoring processing controller 3 comprises a microprocessor, a control program storing ROM, a memory stored with the image data, a calculation result, etc., and so on. The microprocessor performs processing corresponding to the control program, thereby providing the respective functions of a monitoring area control section 35, a monitoring area variation detecting section 36 and a variation sequence detecting section 37.

The approach monitoring processing controller 3 receives continuous digital image data from the bus 2 at a predetermined time interval and allows the image data to be conserved in an image data memory 20. The image data memory 20 is comprised of a plurality of image data memory areas having a size corresponding to one frame of an image taken in the monitoring zone. The image data sequentially received in the approach monitoring controller 3 is so write-controlled as to be reserved at different image data memory areas 31 in a frame unit in the image data memory 20. The write control is made by an image data writing section 21 against the image data memory 20. The image data writing section 21 enables its image data to be sequentially written into the image data memory areas 31 starting from its first image data memory area 31 and, when the image data has been written into the last image data memory area 31, to again return its writing destination back to the first image data memory area 31. Thus the continuous digital image data are reserved over a time period corresponding to the number of frames writable in all the image data memory areas 31 in the image data memory 20.

The monitoring area control section 35 controls a plurality of monitoring areas set in the input images of the monitoring zone. FIG. 2 shows a practical example of setting a plurality of monitoring areas in the monitoring zone. As shown in FIG. 2, a moving path (track) 32 of a target object extends across a plane image 34 of the monitoring zone with a plurality of monitoring areas 33-1, 33-2, . . . included thereon. The size and intervals of the monitoring areas 33-1, 33-2, . . . on the plane image 34 are determined by taking into consideration the speed and size of the target object.

Since the track 32, moving speed and size of the target object are initially known, the monitoring areas 33-1, 33-2, . . . optimally to detect the approaching of the target object can be initially set in the plane image of the monitoring zone. The coordinate information of these monitoring areas 33-1, 33-2, . . . on the plane image 34 is supplied to the monitoring area control section 35. Or the monitoring area control section 35 finds the coordinate information, taking into consideration the track 32, moving speed and size of the target object. The coordinate information of the monitoring areas is supplied from the monitoring area control section 35 to the monitoring area variation detecting section 36.

The monitoring area variation detecting sections 36 are prepared to correspond in number to the monitoring areas 33-1, 33-2, . . . set in the plane image 34. The respective monitoring area variation detecting sections 36 are adapted to detect image variations at the corresponding monitoring areas. The respective monitoring area variation detecting sections 36 are supplied with the coordinate information of the monitoring areas from the monitoring area control section 35 and detects image variations from moment values of a histogram representing the luminance distribution of the monitoring areas.

Figure 3:
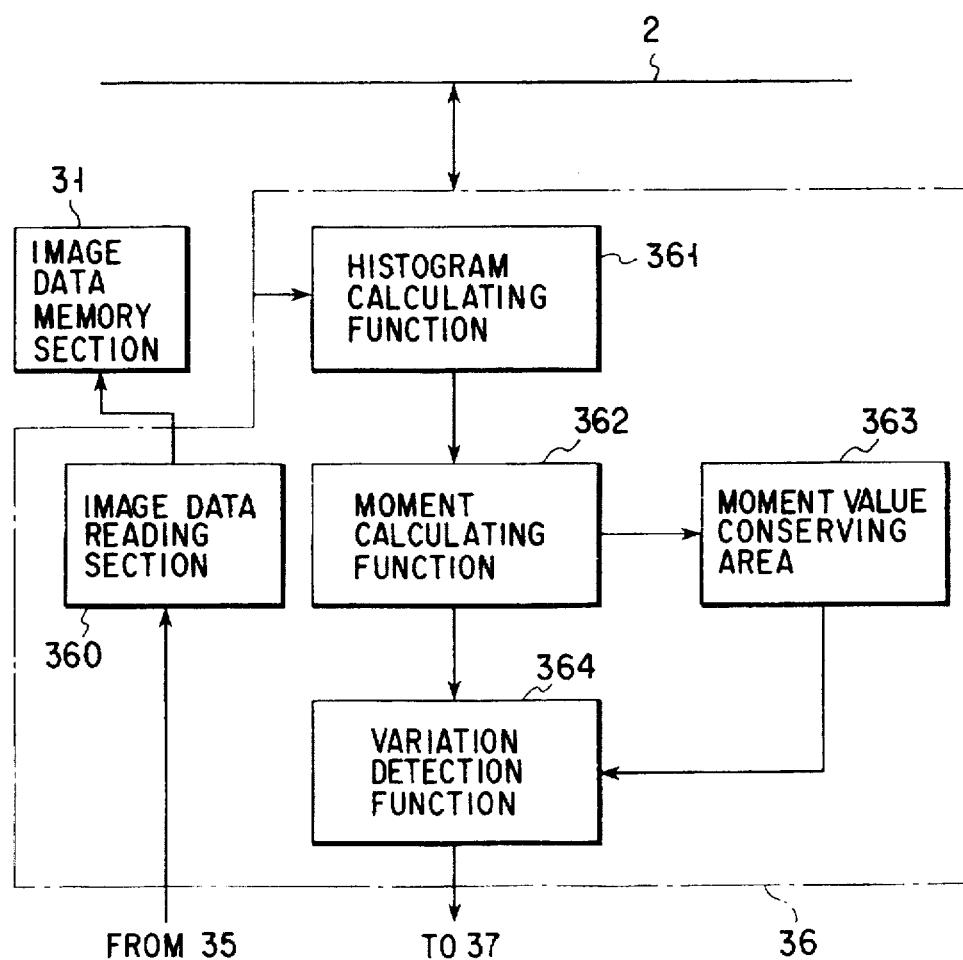
FIG. 3 is a functional block diagram showing a monitoring area variation detecting section.

FIG. 3 shows a functional block diagram of the monitoring area variation detecting section 36.

The monitoring area variation detecting section 36 includes an image data reading section 360 for reading the image data of the input image of the monitoring areas from the image data memory area 31, a histogram calculating function 361 for calculating a histogram with the image data of the monitoring areas normalized with respect to a pixel size, a moment calculating function 362 for calculating a moment value from the histogram of the monitoring areas, a moment value conserving area 363 for reserving the moment values of these monitoring areas of two adjacent images and a variation detecting function 364 for finding a variation of previous and present moment values.

The moment calculating function 362 calculates the moment values of the histogram supplied from the histogram calculating function 361 in predetermined time intervals and sends the moment value to the moment value reserving area 363 and variation detecting function 364.

The moment value reserving area 363 reserves, until the present moment value is supplied from the moment calculating function 362, the previous moment value calculated at the moment calculating function 362. The moment value reserving area 363 outputs the previous moment value to the variation detecting function 364 when the present moment value is received. That is, upon receipt of the present moment value from the moment calculating function 362, the area 363 updates the previous moment value to the moment value received.

The variation detecting function 364 receives the present moment value from the moment calculating function 362 and the previous moment value from the moment value reserving area 363 and finds a rate of change between the previous moment value and the present moment value. If the rate of change exceeds a present threshold value (for example, an empirical value, an experimental value, etc.) upon comparison between the rate of change and the threshold value, then it is decided that a variation has occurred. The result of decision is fed to a variation sequence detecting section 37.

The variation sequence detecting section 37 receives, from the monitoring area variation detecting section 36, the information of the monitoring area where an image variation has been detected. The variation sequence detecting section 37 decides, from the image variation sequence, whether or not the variation of the image in the monitoring zone is caused by the approaching of the target object into the monitoring zone. The variation sequence detecting section 37 has a management table, as shown in FIG. 4, which manages the sequence of those monitoring areas where an image variation is detected. In the management table 370, the flag information for checking for the presence or absence of the image variation, scheduled variation sequence information for initially deciding a scheduled image variation sequence at the respective monitoring areas and real variation sequence information for representing the detection sequence of the image variation, in real practice, at the monitoring areas are managed based on the monitoring area numbers of the monitoring areas.

The operation of the approach detecting apparatus thus constructed will be explained below.

FIG. 5 shows a whole flow chart for deciding the approaching of an object by the approach detecting apparatus.

First, the monitoring areas 33-1, 33-2, . . . as shown in FIG. 2 are set on the plane image 34 in the monitoring zone taken by the image inputting device 1. The monitoring areas 33-1, 33-2, . . . are set at predetermined intervals along the track 32 in accordance with the track 32 showing the moving path of the target object in the monitoring zone, their moving speed and size. The number of the monitoring areas, N, and their size S are determined from the speed, size, etc., of the target object.

The coordinate information of the individual monitoring areas 33-1, 33-2, . . . is input to the monitoring area control section 35. The monitoring area control section 35 supplies the coordinate information of the monitoring areas to be monitored to the monitoring area variation detecting sections 36 corresponding to the respective monitoring areas. By doing so, the monitoring area setting processing is carried out (step 1).

After the setting of the monitoring areas, motion image data of the monitoring zone is continuously sent from the image inputting device 1 to the approach monitoring processing controller 3. The motion image data sent from the image inputting device 1 to the approach monitoring processing controller 3 is composed of continuous frame images and the frame images continue to be sent to the monitoring area control section 35 at predetermined time intervals.

In the approach monitoring processing controller 3, those respective frame images constituting the motion image data are stored in an inputting order in the different image data memory areas 31 through the image data writing section 21 in the monitoring area variation detecting section 36 (step 2). That is, the frame images corresponding to the images in the same monitoring zone and taken at different times continue to be stored in the image data memory areas 31 in the image data memory 20.

When the writing of the image data of the monitoring zone in the image date memory areas 31 is started, the processing for detecting the image variation of the monitoring areas 33-1, 33-2, . . . is performed in the monitoring area detecting section 36 (step 3). The image data of the monitoring areas where an image variation is detected is read from the image data memory areas 31.

FIG. 6 is a flow chart showing a concept of detecting the image variation of the monitoring areas.

The monitoring area variation detecting section 36 sequentially handles, as an image variation deciding target, those monitoring areas of from a smallest monitoring area number to a greatest monitoring area number and repeats it until the variation detection processing is ended. And it detects the image variation in that sequence. At that time, with respect to the monitoring area where the image variation is detected, a flag 1 is set up at the corresponding monitoring area of the management table 370 and, in order to alleviate a burden involved, the monitoring area set up with the flag 1 is excluded from an image variation deciding target.

Of the plurality of monitoring areas, a monitoring area number (ii=0) corresponding to the smallest monitoring area is set in a counter (step 11). It is decided whether or not the flag of the monitoring area number set in the counter is 1 (true)—step 12. If the flag 1 is set up in the corresponding monitoring area number, this time a checking monitoring area shows that the approach detection processing has been ended. In this case, control is shifted to step 18 processing and the number (ii) of the monitoring area for which the image variation is decided is incremented by 1.

If the flag corresponding to the number of the monitoring area set in the counter is 0, the image variation of its monitoring area is decided. The image data reading section 360 read image data of the monitoring area from the image data memory area 31 storing therein an input image taken at a later time than the input image used on the previous image variation decision. In order to extract from the plane image 34 of the monitoring zone stored in the image data memory area 31 the image data of the corresponding monitoring areas, the image data reading section 360 uses the addresses of the monitoring areas shown in the coordinate information of those corresponding monitoring areas supplied from the monitoring area control section 35. The image data of the monitoring areas extracted from the plane image 34 of the monitoring zone is fed to the histogram calculating function 361.

Figure 7A:
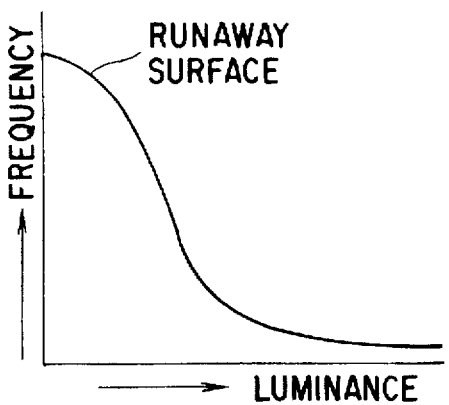
FIG. 7A is a view showing a luminance histogram of monitoring areas before an image variation.
Figure 7B:
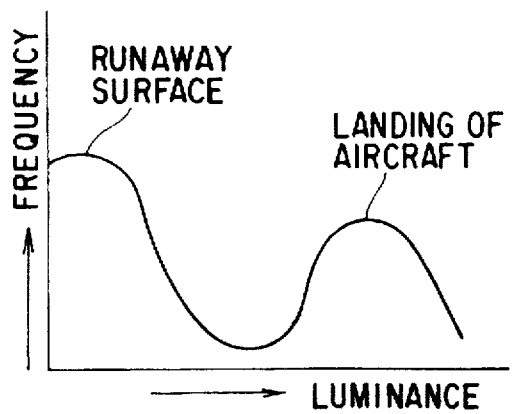
FIG. 7B is a view showing a luminance histogram of the monitoring areas after an image variation.

The histogram calculating function 361 finds a luminance histogram from the image data of the monitoring areas. Let it be assumed that a histogram of FIG. 7A is given with no aircraft approaching into, for example, a runway as the monitoring zone. If any aircraft approaches into the runway of the same monitoring zone, then the histogram varies as shown in FIG. 7B. That is, with the target object approaching into the monitoring zone there occurs a variation in the luminance histogram of the monitoring zone. Generally, since the target object, such as the aircraft, reveals a higher luminance than the background (monitoring zone) of the runway, etc., a peak resulting from the target object emerges on the high luminance side.

The histogram data of the monitoring area found by the histogram calculating function 361 is passed to the moment calculating function 362 so as to calculate the moment value of the monitoring area. histogram data of the monitoring area into an equation below to calculate the moment value of the corresponding monitoring area (step 14).

The moment value=$\Sigma(hist\ [L]\cdot L)(x\cdot y)$

Figure 8:
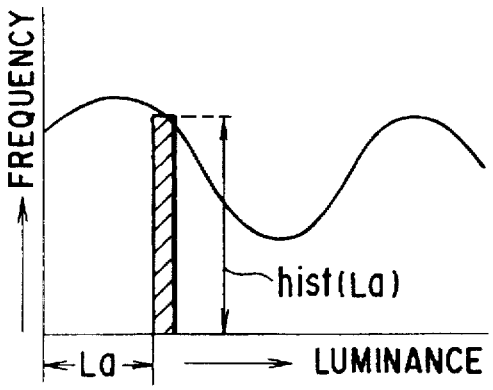
FIG. 8 is a view for explaining a practical example of calculation on a moment value.

In this equation, hist represents a histogram; x, y, the sizes of the respective monitoring areas in the x and in the y direction, and L, a luminance value. As shown in FIG. 8, the histogram area (height of a shaded area) at a given luminance value (La) is multiplied by the luminance value (La) and such multiplied values are cumulatively added over a whole range from the minimal luminance to the maximal luminance level, so that a area calculated by the moment calculating function 362 is supplied as a present moment value to the variation detecting function 364.

The variation detecting function 364 obtains, from the moment value reserving area 363, the previous moment value calculated on the same monitoring area from a predetermined-time-previous image and finds a rate of change from the previous moment value to the present moment value. Comparison is made between the rate of change and a threshold value initially set from a practical experience, etc., and it is decided whether or not the image of the monitoring area varies (step 15). This means that, the greater the rate of change, the greater the change of the image of the monitoring area. If the rate of change of the moment value exceeds the threshold value, then the image varies in the corresponding monitoring area and a flag 1 corresponding to the monitoring area number in the management table 370 is set up (step 16). A number of the monitoring area with the flag 1 set up is registered on the last end of the real variation sequence simultaneously with the flag variation processing. That is, the monitoring area number is arranged with a sequence in which the image variation is detected.

Simultaneously with the processing at step 16 or after this processing, moment updating processing is performed for reserving a present moment value in the moment value reserving area 363 (step 17). And the value of the memory counter is incremented by one and the image variation of the adjacent monitoring area is checked as the image variation target. Regarding the subsequent monitoring area, subsequent series of processing is repeatedly performed.

A plurality of monitoring areas with the flag 0 stored in the management table 370 are picked up and the processing for detecting the image variation is repeated. If any image variation is detected in the monitoring areas during the time period in which one round of the image variation detecting processing is taken, a flag 1 is set up in the monitoring areas so that they are eliminated from the subsequent image variation detecting processing. The repetition is made until the approaching of the target object is detected or the flag is set up in all monitoring areas.

Finally, the track of the target object crossing the monitoring zone is stored in the management table 370 with an order (a real variation sequence) in which it moves across the monitoring areas.

It is to be noted that detecting the variation of all the monitoring areas can be achieved in a parallel way. The monitoring area variation detecting sections 36 corresponding in number to the monitoring areas are operated in a parallel way on the basis of a flow chart in FIG. 9.

In the image data memory 20, continuous image data of these frames corresponding in number to the image data memory areas 31 is stored in the image data memory areas 31. The write control is so performed that, for example, continuous 10 frame images are stored in 10 image data memory areas 31 in a time order in which images are taken. The image data memory areas 31 storing the continuous 10 frame images are set and frame numbers are allocated to these 10 frame images in the time order in which the images are taken. The greater the frame number, the slower the time at which the image is taken.

In the monitoring area variation detecting section 36 a minimal value of the frame image number is set to the counter and the image data of the monitoring area is extracted from the image data memory area 31 corresponding to the frame number. The address of the monitoring area in the image data memory area 31 is designated by the coordinate information supplied from the monitoring area control section 35.

The histogram of the luminance is calculated from the image data of the monitoring areas extracted from the plane image of the monitoring zone and moment values are found from the histogram data. The image variation is decided by comparing the present moment value with a one-frame-previous (previous) moment value of the monitoring area.

If the present moment value is calculated, the moment value is updated and the frame image number is incremented by one and the image data used for the detection of the image variation is shifted by one frame. In the same way as set out above, the moment values are compared between the monitoring areas of the adjacent frame images and the processing is terminated at a point of time when the image variation is detected in the monitoring area.

The above-mentioned image variation detection processing is performed in a parallel way by the monitoring area variation detecting section 36 with respect to the respective monitoring areas and a result of determination is written into the management table 370.

Then the approach decision processing (step 4) in the flow chart of FIG. 5 is carried out. The variation sequence detecting section 37 decides whether or not the target object approaches into the monitoring zone on the basis of the real and scheduled variation sequences written into the management table 370.

As set out above, the scheduled variation sequence area of the management table 370 stores the sequence with which, upon the approach of the target object into the monitoring zone, it moves past the respective monitoring areas. On the other hand, the management table 370 stores the image variation sequence of those monitoring areas where, upon passage of the target object, the image variation occurs. It is decided whether or not any coincidence occurs between the scheduled variation sequence and the real variation sequence. If that coincidence occurs between the two, the target object is decided as approaching into the monitoring zone and, otherwise, a result of decision to the effect that nothing is detected is delivered as an output.

Figure 10A:
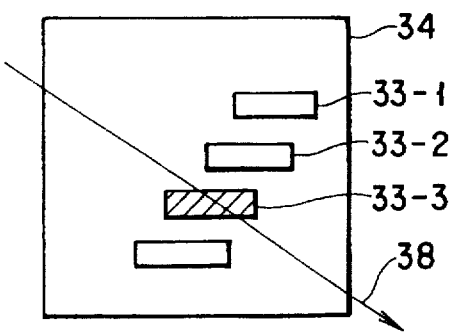
FIG. 10A is a view showing detection monitoring areas when an object other than the target object approaches.
Figure 10B:
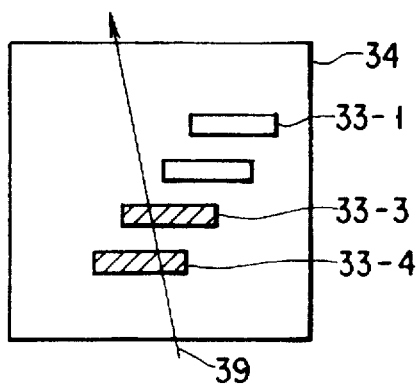
FIG. 10B is a view showing detection monitoring areas when an object other than the target object approaches.
Figure 10C:
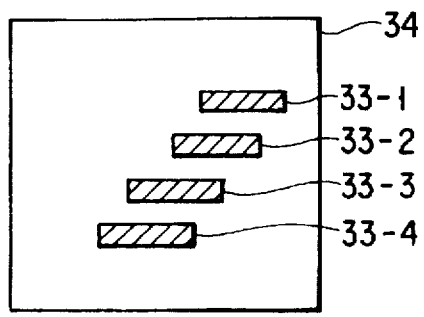
FIG. 10C is a view showing a state of the monitoring areas when there is a sudden illuminance variation.

As shown in FIG. 10A, for example, if another object moves into the monitoring zone along a track 38 different from the track 32 of the target object, the monitoring area number of the monitoring area 33-3 across which the object moves is stored in the real variation sequence at a top position with the other monitoring area numbers not stored. Since the real variation sequence is different from the scheduled variation sequence, a result of decision representing "undetected" is output in the case as shown in FIG. 10A.

Where another object moves into the monitoring zone along a track 39 different from the track 32 of the target object as shown in FIG. 10B, monitoring areas numbers of the corresponding monitoring areas 33-4 and 33-3 across which it moves are stored in the real variation sequence. Even in such a case, a result of decision representing "undetected" is output because the real variation sequence is different from the scheduled variation sequence.

Where the illuminance of the monitoring zone rapidly varies in a short time and the brightness of the whole image is increased, an image variation is detected almost simultaneously at all the monitoring areas as shown is FIG. 10C. In this case, no variation sequence is stored at the real variation sequence area in the management table 370. Or the monitoring area numbers are stored in a random order. Therefore, a result of decision representing "undetected" is output even in a case as shown in FIG. 10C.

Since the histogram of the luminance data of the monitoring areas is used for the detection of the image variation of the monitoring areas, it is possible to make, very small, an adverse influence from noise locally contained in the image of the monitoring areas and hence to prevent a detection error resulting from the noise.

The moment values are found from the histogram of the luminance data of the monitoring areas and the image variation of the monitoring areas is detected from the rate of change of the moment values. It is, therefore, possible to enhance the detection accuracy of the image variation of a high luminance resulting from the target object and to positively prevent a loss of detection of the target object.

(Second Embodiment)

Figure 11:
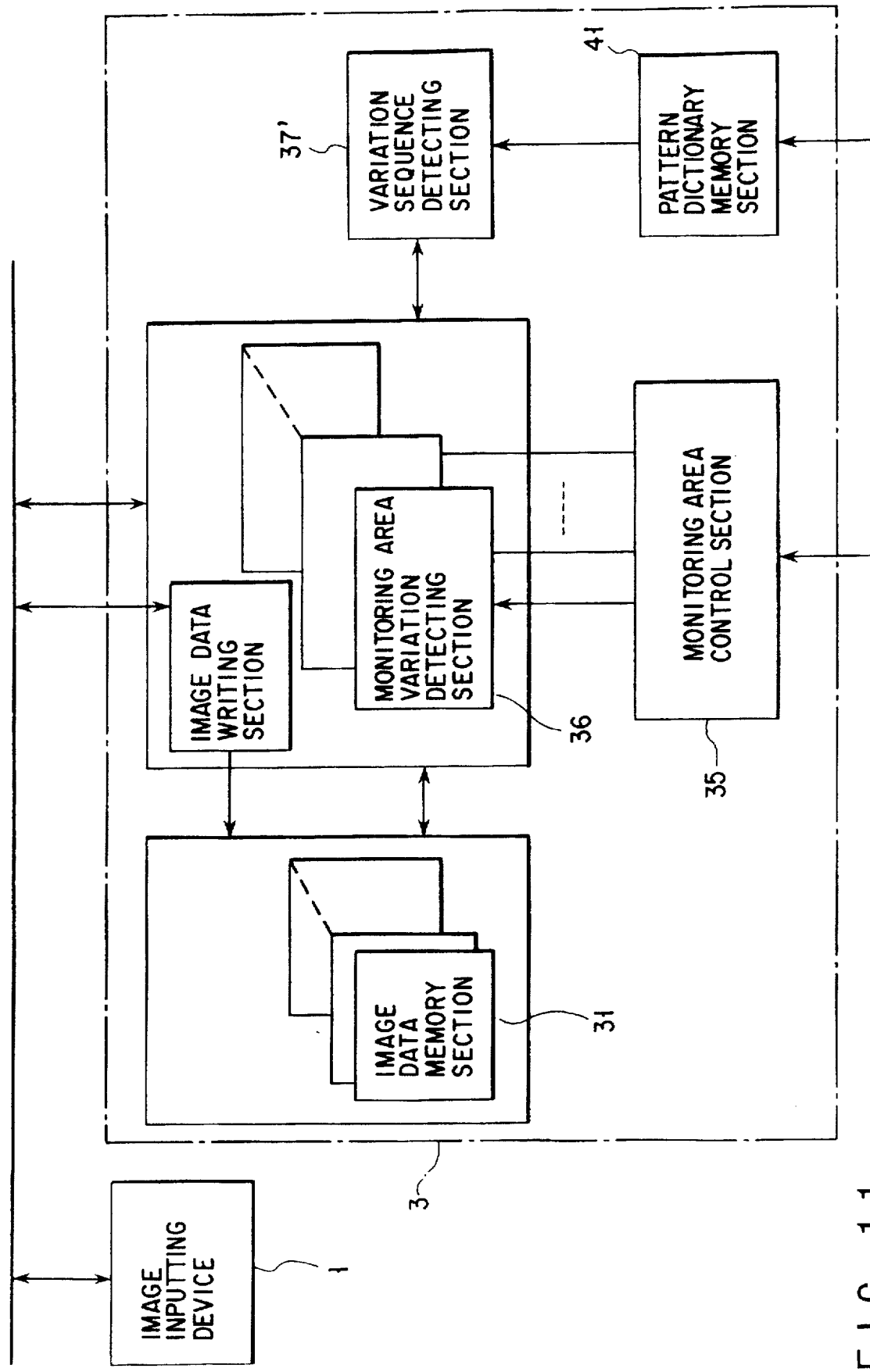
FIG. 11 is a block diagram showing an apparatus, according to a second embodiment, for detecting the approaching of a target object.

FIG. 11 shows a functional block diagram of an approach detecting apparatus according to a second embodiment.

The approach detecting apparatus comprises, except for a variation sequence detecting section 37 and pattern directory memory section 41, the same arrangement as that of the first embodiment. That is, the approach monitoring processing controller 3 comprises an image data memory area 31, a monitoring area control section 35, a monitoring area variation detecting section 36 and a variation sequence detecting section 37 and, further, a pattern dictionary memory section 41 for storing a detection sequence pattern, and so on.

Figure 12:
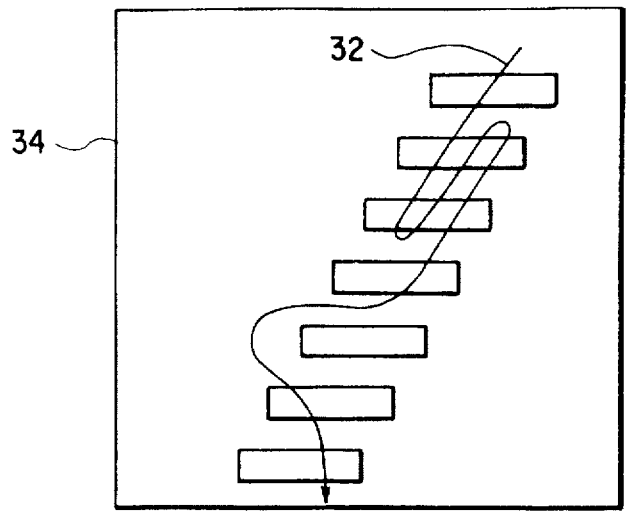
FIG. 12 is a view showing a complex track.

The pattern dictionary memory section 41 can store a detection sequence pattern corresponding to a complex track. Where a target object moves into a monitoring zone along a complex track 32 as shown in FIG. 12, the sequence with which the target object moves past the monitoring areas is shown with a detection sequence pattern. The track 32 as shown in FIG. 12 includes not only one approach direction but also a backward direction.

Figure 13:
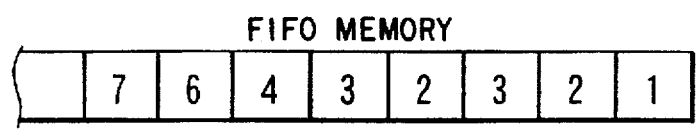
FIG. 13 is a view showing a memory configuration for managing a detection sequence.

The variation sequence detecting section 37 has a FIFO memory, as shown in FIG. 13, for storing a real variation sequence. The FIFO memory sequentially stores the number of those monitoring areas where an image variation is detected. Where the target object moves along the track 32 as shown in FIG. 12, the real variation sequence of the monitoring area numbers stored in the FIFO memory is as shown is FIG. 13.

For the case of the track 32 along which the target object moves across the same monitoring areas a plurality of times as shown in FIG. 12, it is not possible to eliminate, from image variation detection processing, those monitoring areas with a flag 1 set up as in the first embodiment. It is because, upon the movement of the target object past the monitoring areas twice, there is a possibility that the second image variation will go undetected at the monitoring areas above. In the image variation detection processing at the monitoring area variation detecting section 36 which detects the image detection of the monitoring areas, therefore, even the monitoring areas with a flag 1 set up is included in the image variation detection processing. Or flag variation processing is stopped.

Figure 9:
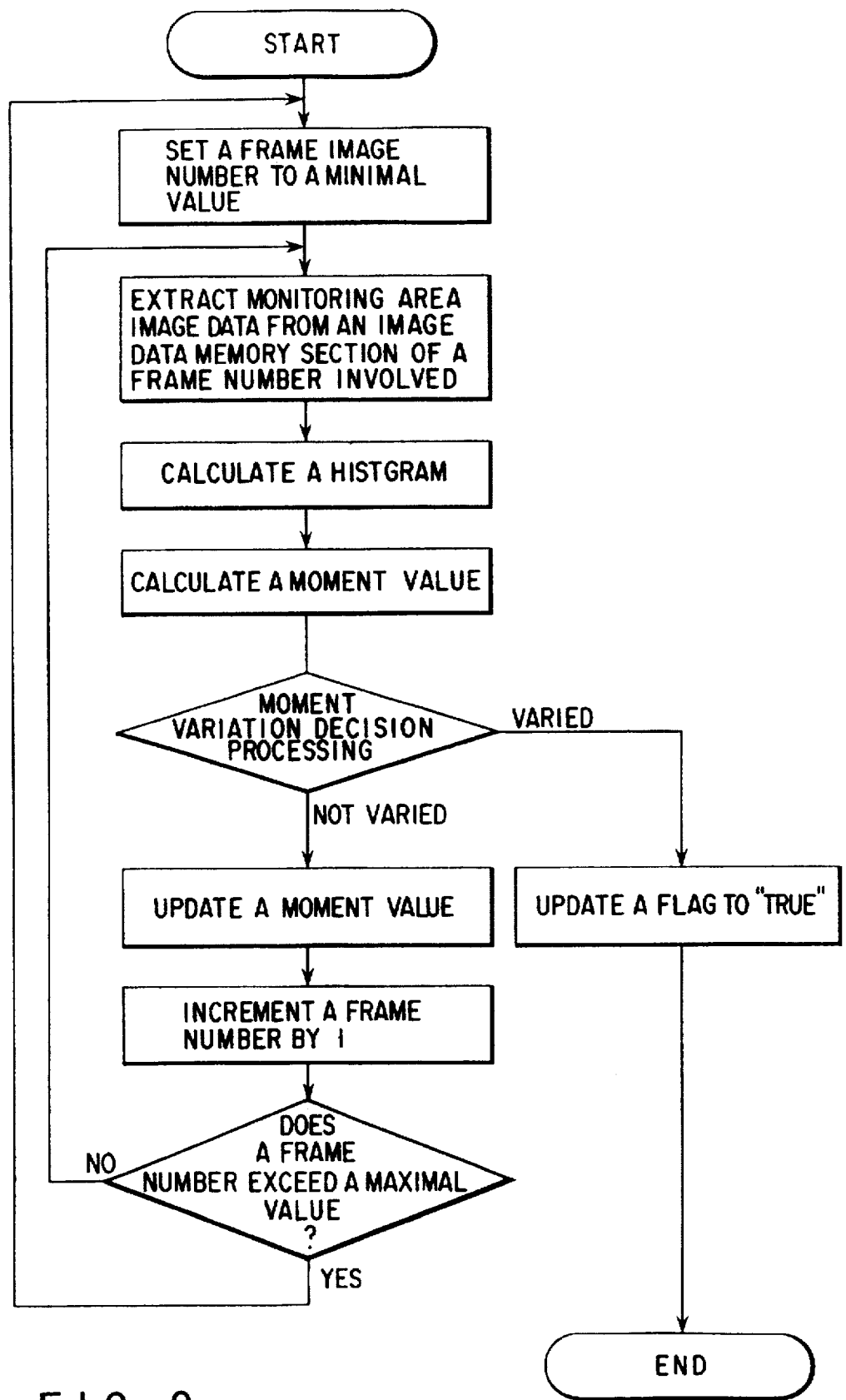
FIG. 9 is a flow chart for parallel processing by a monitoring area variation detecting section.

The image variation detection processing at the monitoring area variation detecting section 36 is performed, except for the flag variation processing, as in the first embodiment, in accordance with the flow chart of FIG. 6 or FIG. 9 and those monitoring area numbers corresponding to the detected image variation are informed to the variation sequence detecting section 37 in accordance with the variation detection order. The variation sequence detecting section 37 allows the monitoring area number to be received in the FIFO memory in accordance with the number informed from the monitoring area variation detecting section. As a result, the monitoring area numbers are arranged in the FIFO memory in the order in which the image variation is detected. The array of the monitoring area numbers stored in the FIFO memory represents the real variation sequence.

Thereafter, the variation sequence detecting section 37 compares the sequence of the image variation in the monitoring areas with the variation detection sequence pattern stored in the pattern dictionary memory section 41 and, if a coincidence occurs between the sequence of the image variation in the monitoring areas and the variation detection sequence pattern stored in the pattern directory memory section 41, the variation sequence detecting section 37 detects the approaching of the target object into the monitoring zone and outputs a result of decision corresponding to the detection of the approaching object. If there occurs a non-coincidence, it outputs a result of decision showing that no target object approaches into the monitoring zone.

According to the present invention, even if approaching while describing such a complex track 32 as not to be matched to the array sequence of the monitoring areas, the target object can be positively detected as approaching in the monitoring zone so long as it corresponds to the sequence of the variation detection sequence pattern.

(Third Embodiment)

Figure 14:
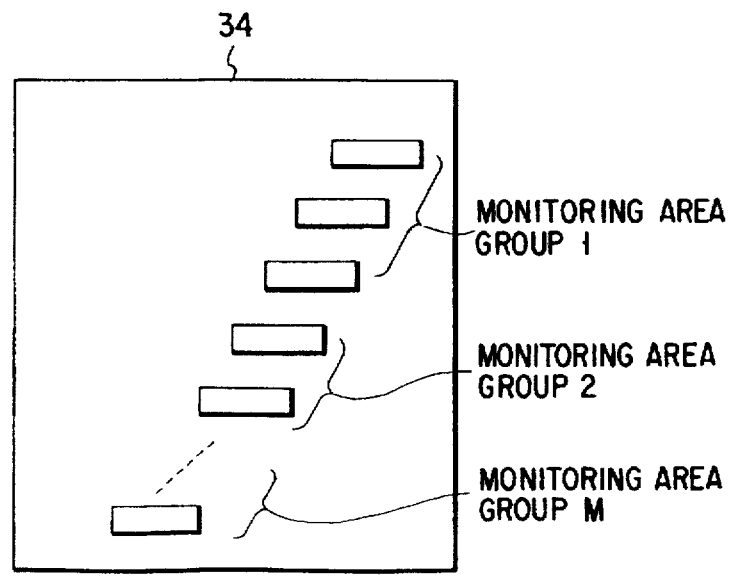
FIG. 14 is a view showing the division, into groups, of monitoring areas in a third embodiment.

As shown in FIG. 14, a plurality of monitoring areas are set along a track running across a monitoring zone with the number N of monitoring areas divided into M groups and, if the sequence of the monitoring areas in which an image variation is detected in no backward sequence relative to a scheduled sequence and at least one monitoring area in a respective group involves an image variation, then decision is made as a target object approaching into the monitoring zone.

Figure 15A:
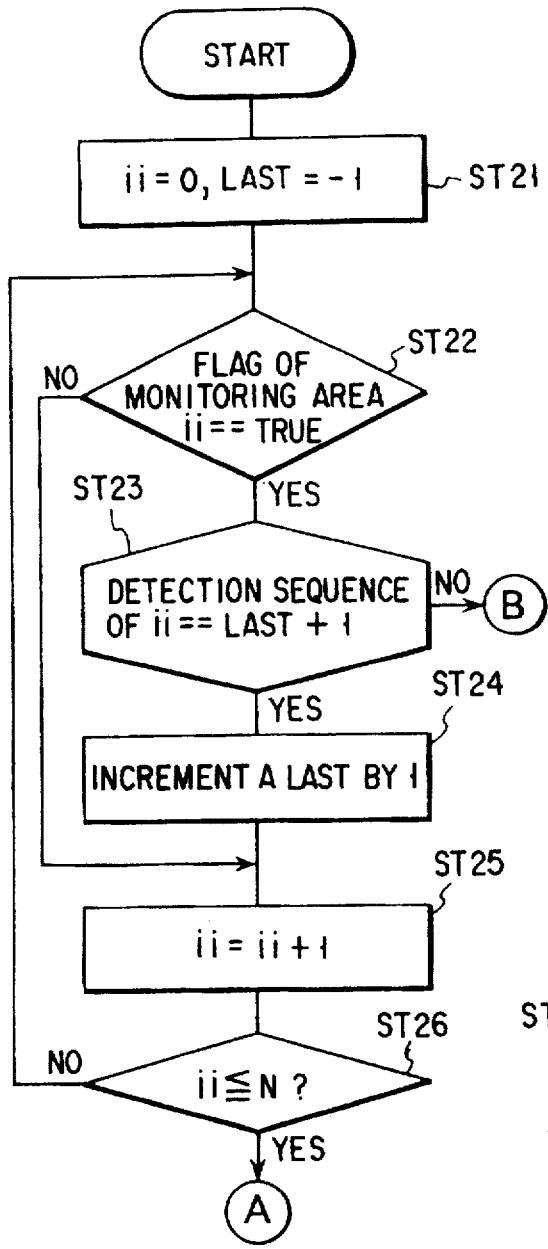
FIG. 15A is a flow chart for detecting a backward deviated sequence relative to a real variation sequence.
Figure 15B:
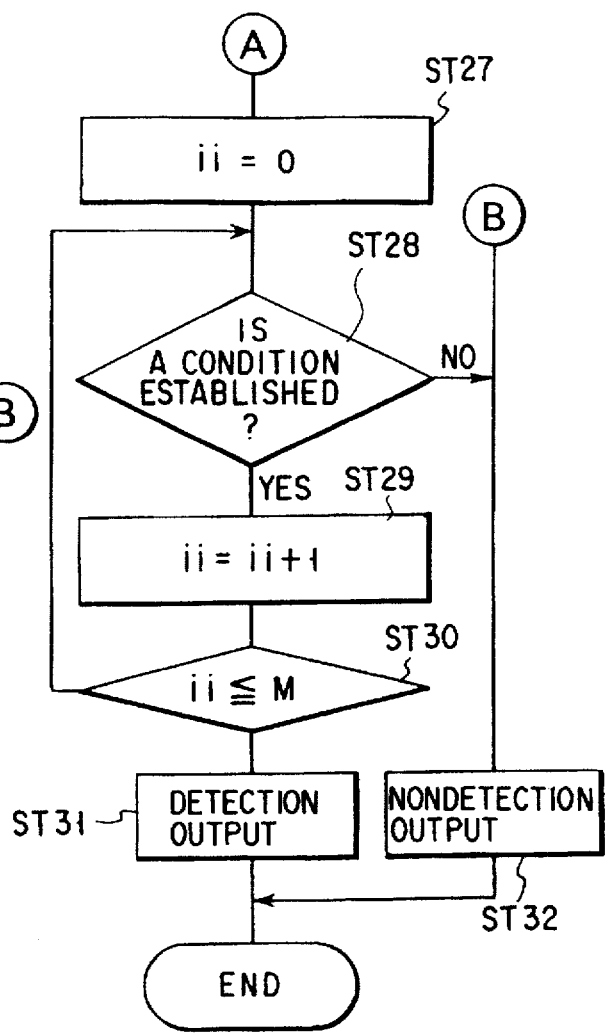
FIG. 15B is a flow chart for monitoring an image variation at the monitoring areas in groups.

Approach decision processing is effected at a variation sequence detecting section 37 in accordance with a flow chart as shown in FIGS. 15A and 15B. Monitoring is made in accordance with the flow chart of FIG. 15A to see any backward/forward sequence occurring relative to a real variation sequence and, in accordance with the flow chart shown in FIG. 15B, monitoring is made as to the condition of whether or not there occurs an image variation in at least one monitoring area in a respective group.

In the management table 370 of the variation sequence detecting section 37 a flag 1 is set up in the monitoring area number of the monitoring area where an image variation is detected by a monitoring area variation detecting section 36. That is, flag update processing is carried out in accordance with the image variation detection of the monitoring area. Let it be assumed that the sequence with which the target object moves past the monitoring area coincides with the monitoring area number.

The variation sequence detection section 37 scans the flag information of the management table 370 in accordance with the scheduled variation sequence of the monitoring area and detects an image variation in the monitoring areas. That is, an initial value 0 of the monitoring area number and an initial value −1 of the real variation sequence are set, respectively, in a counter (step 21) and flag information of a monitoring area number 0 is taken from the management table 370. It is decided whether or not the flag 1 is set up in the monitoring area number 0 (step 22). If the flag 1 is set up, it is decided whether or not the detection sequence (that is, 0) of the monitoring area number coincides with a numeral ⌈0⌉ obtained by incrementing by 1 an initial value −1 in the real variation sequence set in the counter (step 23). If a coincidence occurs between the two, the real variation sequence −1 presently set in the counter is incremented by 1 and the counter is updated to ⌈0⌋—step S24. The monitoring area number set in the counter is incremented by 1 and the counter is updated to the numeral ⌈1⌋—step S25. And the flag information of the updated monitoring area number 1 is taken from the management table 370 and the processing from step 22 through step 26 is repeated.

Figures 16, 17, 19, 20:
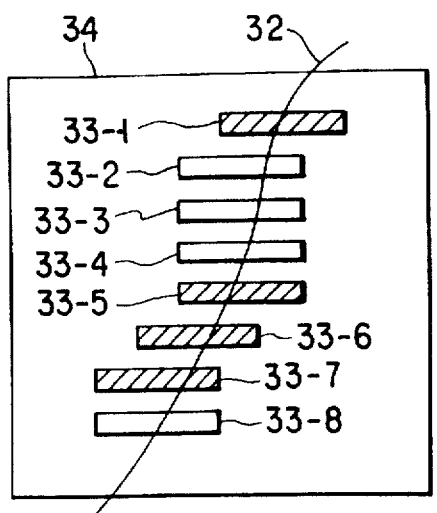
FIG. 16 is an array of a management table on a variation sequence detecting section.
FIG. 17 is an array of a management table in a fourth embodiment.
FIG. 19 is a relation between a track and weight factors of monitoring areas in a fifth embodiment.
FIG. 20 is an array of a weight factor table in the fifth embodiment.

Here, if, in the processing of step 22, any flag 1 is not set up in the present monitoring area number, the numeral of the real variation sequence is not incremented and only the numeral of the monitoring area number is incremented. If, as shown in FIG. 16, those monitoring areas in which an image variation is detected correspond to the monitoring area numbers 0, 2, 3 and 5, then the monitoring area number 2, for example, corresponds to a number ⌈1⌋ (the detection order starts from 0) and, at that time, the real variation number corresponds to ⌈1⌋. The same thing is done in other monitoring area numbers 0, 3 and 5. That is, the monitoring areas include those where no image variation is detected (monitoring area numbers 1, 4) and some monitoring area where the image variation is detected involves a coincidence between the detection sequence and the real variation sequence and there occurs no background course in the detection sequence. Stated in more detail, the backward deviation of the detection sequence means that the image variation of the monitoring area number 5 is detected earlier than that of the monitoring area number 2.

In the processing of step 22, no image variation is detected and, at a flag 0, control goes to step 24 and the image variation of the next monitoring area is detected. If there occurs no coincidence between the two in the processing of step 23, a result of decision corresponding to non-detection is delivered as an output—step 32.

If the flag information of all the monitoring area numbers is scanned, it is decided, based on the flow chart shown in FIG. 15B, whether or not the image variation of at least one monitoring area in the respective group is detected. That is, an initial value ii=0 of the group number is set to the counter (step 27) and it is decided whether or not at least one flag 1 is present in the monitoring area in the group number set in the counter (step 28). Where there is a flag 1 in the group, the following group number is successively set in the counter (step 29) and the same processing is repeatedly performed (step 28 to step 30). As shown in FIG. 16, the group numbers are so set as to be arranged in the order in which the scheduled variation is detected. If there exists at least one flag 1 in the respective group, the target object is detected as approaching into the monitoring zone and a result of decision corresponding to the detection of the approaching object is delivered as an output (step 31).

According to such embodiment, even if an image variation fails to be detected in some monitoring area in one group, it is possible to prevent a detection loss of the approaching target object when the image variation is detected in other monitoring areas in the same group.

The approach decision processing of the target object above can be applied to these in the first and second embodiments. The third embodiment, being applied to the second embodiment, includes the same flag update processing as in the first embodiment.

(Fourth Embodiment)

This embodiment holds the time at which an image variation is detected at the monitoring areas, monitors the detection time interval at these monitoring areas where detection is made at two forward/backward adjacent times and, based on the detection time interval, decides whether or not the object approaching into the monitoring zone is a target object. A "time stamp" column is set in a management table for storing a monitoring area detection time.

FIG. 17 shows an array of the management table provided in a variation sequence detecting section 37. The management table 370 allows the storing of a time stamp representing a "flag 1" time in the monitoring area number with that flag 1 set up by the detection of an image variation in the monitoring areas.

A monitoring area variation detecting section 36 detects an image variation in the respective monitoring areas, informs it to the variation sequence detecting section 37, enables the updating of the flag in the management table 370 in the variation sequence detecting section 37 and the storing of a corresponding time stamp and detects the approaching of the target object into the monitoring zone.

Figure 18:
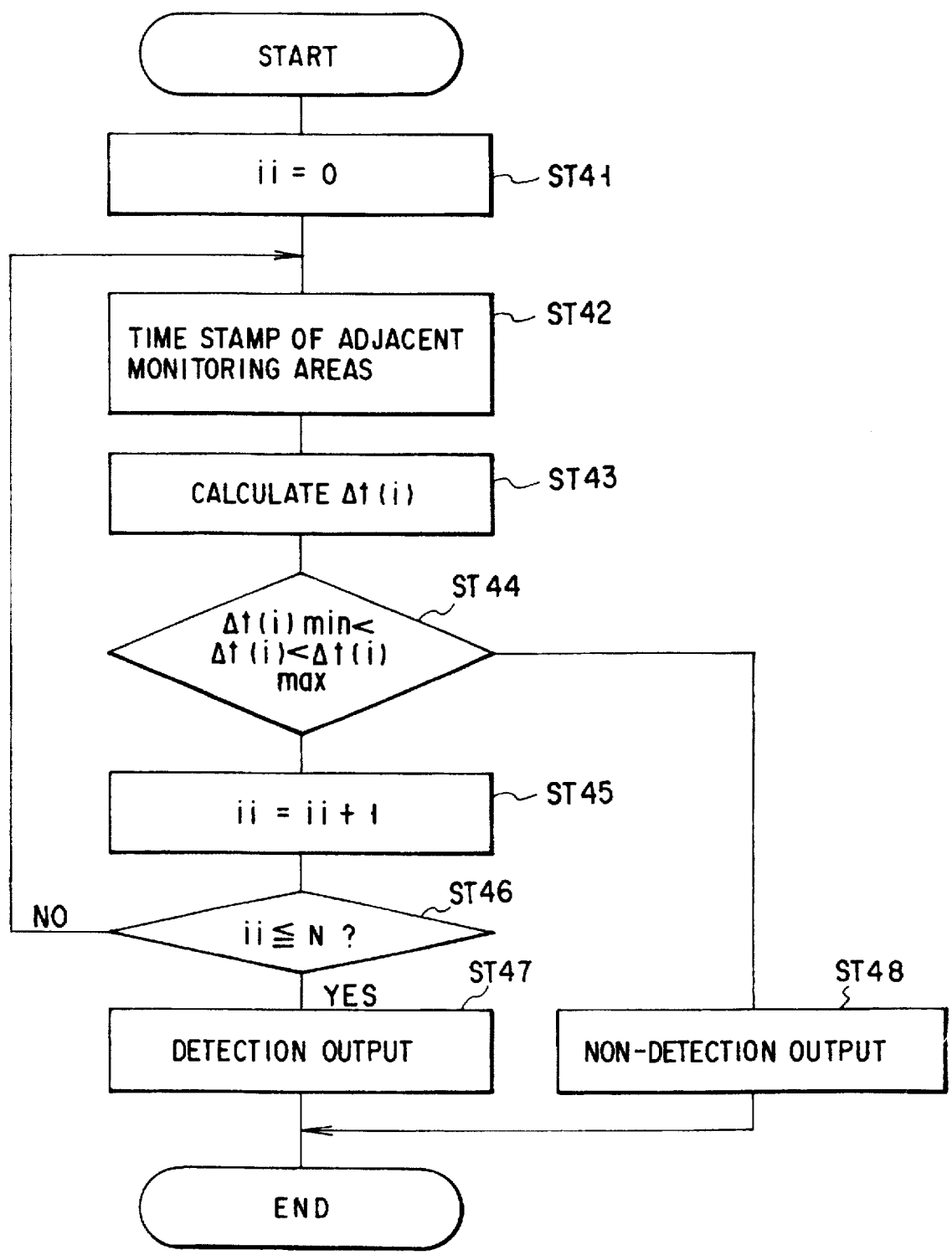
FIG. 18 is a flow chart showing approach decision processing in the fourth embodiment.

FIG. 18 shown a flow chart for detecting the approaching of the target object into the monitoring zone.

After the setting of a monitoring area number (ii=0) designating an initial monitoring area (step 41), the time stamps of the monitoring are ii=0 and adjacent monitoring area ii=ii+1 are read from the management table 370—step 42—and a detection time interval Δt (i) between these adjacent monitoring areas is calculated (step 43). It is decided whether or not the detection time interval Δt (i) is in a predetermined time interval Δt (i)—step 44. If the detection time interval Δt (i) is in the predetermined time interval, the monitoring area number of the target monitoring area is varied to the next monitoring area number ii=ii+1 (step 45). The time stamp is read from the management table 370 and the detection time interval Δt (i) between the monitoring area ii=ii+1 and the next monitoring area is calculated in the same way as set out above and the same processing as set out above is repeatedly performed (steps 42 through step 46).

If, in all the respective monitoring areas, the respective detection time intervals are in the predetermined time interval range, step 47 detects the approaching of the target object into the monitoring zone and outputs a result of decision on the detection of the approaching of the object. In processing of step 44, the detection time interval Δt (i) between any adjacent monitoring areas exceeds the predetermined time interval range, the non-detection of the object is output as a result of decision (step 48).

According to the present embodiment, the speed and track 32 at and along which the target object moves in the monitoring zone is initially set and, even if another object enters into the same track 32 as that of the target object, it is possible to decide that object as approaching into the monitoring zone when it is different from the target object with respect to the detection time interval between the respective monitoring areas and hence to initially prevent a detection error when the second object enters into the same track 32.

(Fifth Embodiment)

A track 32 of a target object has those important areas to detect the approaching of the object into a monitoring zone. In the case where it is decided whether or not the target object approaches into the monitoring zone, a greater weight factor is set to those important ones of monitoring areas where an image variation is detected. If, for example, the target object approaches into the monitoring zone along a curved track, it is very important to detect the image variation at the curved portions of the track and a greater weight factor is set to the monitoring areas corresponding to the curved portions of the track.

Where the monitoring areas 33-1, 33-2, . . . are set along the track 32 as shown in FIG. 19, a different weight factor is set to the monitoring areas 33-1. . . . . A variation sequence detecting section 37 is equipped with a factor table including stored different factors set to the monitoring areas as shown, for example, in FIG. 20. In FIG. 19, cross-hatched monitoring areas are represented as having the greater weight factors and non-cross-hatched monitoring areas as having smaller weight factors.

If the monitoring areas have weight factors in the monitoring area setting processing, a monitoring area control section 35 sets weight factors to the monitoring areas. A monitoring area variation detecting section 36 detects an image variation from the monitoring area set on the respective image and sends it to a variation sequence detecting section 37.

Based on the following equation, the variation sequence detecting section 37 finds an evaluation function E with respect to the monitoring areas where an image variation occurs.

$$E = W(i) - Det(i)$$

where

W: the weight factor,

Det: the monitoring area in which an image variation occurs; and i: the monitoring area number.

When the evaluation function E exceeds an initially set decision reference value, it is decided that an already known object is detected as approaching into the monitoring zone. Unless an image variation is detected at the monitoring area of a greater weight factor, there is a high possibility that the evaluation function E will be lower than the decision reference value. If the evaluation function E is lower than the decision reference value, it is decided that the target object approaches into the monitoring zone.

According to such embodiment, the greater weight factors are set to the very important monitoring areas on the track of the target object and the smaller weight factors are set to the other monitoring areas. Even in the case where the approaching of the object into some monitoring area of a relatively small weight factor fails to be detected, it is possible to detect the approaching of the object if there are more detections of an image variation in those monitoring areas of greater weight factors. On the other hand, even in the case where there is more detections of an image variation in those monitoring areas of smaller weight factors, it is possible to, if their evaluation function E is small, decide an approaching object as being a moving object other than the target object and to output a result of decision indicating that no target object is detected.

(Sixth Embodiment)

This embodiment uses a system arrangement as shown in FIG. 11. That is, in this arrangement, an approach monitoring processing control section includes an image data memory section 31, a monitoring area control section 35, a monitoring area variation detecting section 36, a variation sequence detecting section 37 and a pattern dictionary memory section 51.

After detecting an image variation in the image of the monitoring areas by the monitoring area variation detecting section 36, when in the variation sequence detecting section 37 an image variation detection sequence of monitoring areas where an image variation occurs is substantially matched to an image variation detection sequence of the pattern dictionary memory section 51 and a cumulative value obtained by multiplying the respective monitoring areas (where an image variation occurs) by corresponding weight factors exceeds a predetermined reference value, the monitoring area variation detecting section 36 detects a target object as approaching into the monitoring zone.

According to this embodiment, even in the case where the target object moves into the monitoring zone on a complex track, if greater weight factors are set to those monitoring areas on the most important track portion, it is possible to detect the approaching of the target object into the monitoring zone even when an image variation does not necessarily occur in all the monitoring zones on a whole track. It is needless to say that, even if the target object follows a simpler track, not in any complex track, in the monitoring zone, the same thing can be applied. This embodiment can also be applied to the case where only a target object approaching in the monitoring zone along a given one of a plurality of tracks is detected.

(Seventh Embodiment)

Where an N number of monitoring areas are initially set in a plane image 34 in the monitoring zone and there occurs an image variation in an n number of monitoring areas of these monitoring areas, a variation sequence detecting section 37 performs approach decision processing. That is, when a condition $\alpha < (n/N)$ is satisfied and there occurs no backward deviation in a sequence (a real variation detection sequence) of the monitoring areas where an image variation is detected, an output is produced as a result of decision indicating that the approaching of a target object is detected. There, a denotes a constant. It is not necessary that the real variation detecting sequence be completely matched to a scheduled variation detection sequence. However, unless the real variation detection sequence is backward deviated with respect to the scheduled variation detection sequence, decision is made, indicating that there occurs a reverse phenomenon.

According to the present embodiment, even if an image variation fails to be detected in some monitoring area, it is possible to positively detect the approaching of the target object in the monitoring zone.

Although, in the above-mentioned respective embodiments, the monitoring area control section 35 and monitoring area variation detecting section 36 are provided in plural pairs in a correspondence relation, it may be possible to provide, for example, the monitoring area control section 35 and monitoring area variation detecting section 36 in one pair in which case, for each image prepared from respective digital image data received for each predetermined time, the monitoring area variation detecting section 36 takes specified coordinate information from the monitoring area control section 35 on the basis of a predetermined order so as to reserve, in a flag memory, the data of whether or not there occurs an image variation in an image of the monitoring areas involved.

What is claimed is:

1. A method for detecting approaching of a target object into a monitoring zone in which the target object is scheduled to enter, comprising the steps of:

continuously taking a picture of the monitoring zone to provide continuous moving picture data of the monitoring zone;

initially setting a plurality of monitoring areas along a track of the target object in an image of the monitoring zone and extracting image data from the monitoring areas from the moving picture data;

processing the image data of the monitoring areas for each monitoring area and detecting an image variation of each monitoring area; and deciding that of the target object is approaching into the monitoring zone in accordance with a detection sequence of monitoring areas where an image variation is detected.

2. The method according to claim 1, wherein the deciding step comprises initially setting a scheduled variation sequence determining a sequence of the monitoring areas corresponding to the image variation detected when the target object approaches into the monitoring zone, comparing the detection sequence of the monitoring areas corresponding to the detected image variation with the scheduled variation sequence and deciding whether or not the target object approaches into the monitoring zone.

3. The method according to claim 2, wherein the deciding step includes:

deciding whether or not there occurs any backward deviated detection sequence relative to the scheduled variation sequence in the detection sequence of a plurality of monitoring areas corresponding to the detected image variation;

deciding approaching of whether or not there is at least one of the monitoring areas corresponding to the detected image variation in each of groups into which the plurality of monitoring areas are divided in accordance with the scheduled variation sequence; and deciding approaching of the target object into the monitoring zone when the detection sequence is not backward deviated and decision is made to the effect that, in the respective groups, there is at least one of the monitoring areas corresponding to the detected image variation.

4. The method according to claim 2, wherein the deciding step includes:

finding a detection time interval between the monitoring areas of a forward/backward deviated adjacent detection sequence in a plurality of monitoring areas corresponding to the detected image variation; and comparing, with an initially set threshold value, the detection time interval relative to all the monitoring area pairs of the forward/backward deviated detection sequence and, when all the detection time intervals are in the threshold value range, deciding the target object as approaching into the monitoring zone.

5. The method according to claim 2, wherein the deciding step includes:

finding a ratio (n/N) between a total number of initially set monitoring areas, N, and the number of those monitoring areas, n, corresponding to detected image variation;

deciding whether or not there occurs any backward deviated sequence relative to the scheduled variation sequence in the detection sequence of a plurality of monitoring areas corresponding to the detected image variation; and deciding the target object as approaching into the monitoring zone both when decision is made to the effect that the detection sequence is not backward deviated and when the ratio (n/N) exceeds on initially determined threshold value.

6. The method according to claim 2, wherein the deciding step includes:

initially setting weight factors to the respective monitoring areas in accordance with the degrees of importance; and deciding the target object as approaching into the monitoring zone when a cumulative value of the weight factors exceeds the predetermined threshold value.

7. The method according to claim 1, wherein the image variation detecting step includes:

preparing a luminance histogram from the image data of the monitoring areas; and detecting the image variation of the monitoring areas with the use of the histogram of the monitoring areas.

8. The method according to claim 7, wherein the image variation detecting step includes:

finding a moment value of the monitoring area from the histogram of the monitoring area in accordance with the following equation of $$\text{the moment value} = \Sigma(hist(ii) \times ii)$$

where ii represents a luminance value and hist(ii) the frequence of the luminance value; and deciding the image of the monitoring area as varying when the variation of the moment value is detected relative to the monitoring area.

9. An apparatus for detecting approaching of a target object into a monitoring zone in which the target object is scheduled to enter, comprising:

image inputting means for taking a picture of the monitoring zone to provide moving picture data continuously;

monitoring area controlling means for managing, based on coordinate information of a monitoring display for the monitoring zone, a plurality of monitoring areas in the monitoring zone on a track along which the target object moves;

means for extracting, from the moving picture data, image data of the plurality of monitoring areas managed by the monitoring area controlling means;

image variation detecting means for processing the image data of the monitoring areas for each monitoring area and for detecting an image variation of each of the monitoring areas; and deciding means for deciding whether or not the target object approaches into the monitoring zone on a basis of a sequence of monitoring areas where an image variation is detected.

10. The apparatus according to claim 9, wherein the deciding means includes:

means for managing, with respect to the respective monitoring areas where an image variation is detected by the image variation detecting means, a real variation sequence showing an image variation detection sequence of the monitoring areas involved;

means for managing a scheduled variation sequence showing an image variation sequence of the monitoring areas involved upon approaching of the target object into the monitoring zone; and means for comparing the real variation sequence with the scheduled variation sequence so as to detect that the target object approaches into the monitoring zone.

11. The apparatus according to claim 10, wherein the deciding means includes:

means for deciding whether or not there occurs any backward deviated sequence relative to the scheduled variation sequence in the real variation sequence of the monitoring areas corresponding to the detected image variation;

means for deciding whether or not there is at least one of monitoring areas corresponding to the detected image variation in each of group information items into which the plurality of monitoring areas are divided in accordance with the scheduled variation sequence; and means for deciding the target object as approaching into the monitoring zone when the detection sequence is not backward deviated and decision is made to the effect that, in the respective group, there is at least one of the monitoring areas corresponding to the detected image variation.

12. The apparatus according to claim 10, where the deciding means includes:

means for finding a detection time interval between the monitoring areas of a backward/forward deviated adjacent detection sequence relative to a plurality of monitoring areas corresponding to the detected image variation; and means for, comparing, with an initially determined threshold value, the detection time interval relative to all the monitoring area pairs of the forward/backward deviated detection sequence and, when the detection time interval is in the threshold value, deciding the target object as approaching into the monitoring zone.

13. The apparatus according to claim 10, wherein the deciding means includes:

means for finding a ratio (n/N) between a total number of monitoring areas, N, managed by the monitoring area controlling means and the number of the monitoring areas, n, corresponding to the image variation detected by the image variation detecting means;

means for deciding whether or not there occurs any backward deviated sequence relative to the scheduled variation sequence in the real variation sequence of a plurality of monitoring areas corresponding to the detected image variation; and means for deciding the target object as approaching into the monitoring zone when decision is made to the effect that the detection sequence is backward deviated and the ratio (n/N) exceeds a predetermined threshold value.

14. The apparatus according to claim 10, wherein the deciding means includes:

means for reserving weight factors of the respective monitoring areas;

means for reading, from the reserving means, the weight factors of the monitoring areas corresponding to the detected image variation;

means for cumulatively adding the weight factors of the monitoring areas corresponding to detected image variation; and means for deciding the target object as approaching into the monitoring area when the cumulatively added value of the weight factors exceeds the threshold value.

15. The apparatus according to claim 9, wherein the image variation detecting means includes:

means for preparing a luminance histogram from the image data of the monitoring areas; and means for detecting the image variation of the monitoring areas with the use of the histogram of the monitoring areas.

16. The apparatus according to claim 9, wherein the image variation detecting means includes:

means for preparing a luminance histogram from the image data of the monitoring areas;

means for detecting the image variation of the monitoring areas with the use of the histogram of the monitoring areas;

means for finding a moment value of the respective monitoring area from the histogram of the monitoring areas in accordance with the following equation of $$\text{the moment value} = \Sigma(hist(ii) \times ii)$$

where ii represents a luminance value and hist(ii) the frequency of the luminance value ii; and means for deciding the image of the monitoring area as varying when the variation of the moment value is detected with respect to the monitoring area.

* * * * *